United States Patent
Magee (10) Patent No.: US 8,834,369 B2
(45) Date of Patent: Sep. 16, 2014

(54) RECEIVE BEAMFORMER FOR ULTRASOUND

(75) Inventor: David P Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1048 days.

(21) Appl. No.: 12/487,097

(22) Filed: Jun. 18, 2009

(65) Prior Publication Data

US 2009/0326375 A1 Dec. 31, 2009

Related U.S. Application Data (60) Provisional application No. 61/076,173, filed on Jun. 27, 2008.

(51) Int. Cl.
- *A61B 8/00* (2006.01)
- *G10K 11/34* (2006.01)
- *G01S 7/52* (2006.01)
- *G01S 15/89* (2006.01)

(52) U.S. Cl.
CPC .......... *G10K 11/346* (2013.01); *G01S 7/52046* (2013.01); *G01S 15/8915* (2013.01)
USPC .......... 600/437; 600/447; 600/459; 367/138; 367/103; 367/11; 367/119; 367/7

(58) Field of Classification Search
None
See application file for complete search history.

(56) References Cited

U.S. PATENT DOCUMENTS

| | | | | |
|---|---|---|---|---|
| 4,562,540 A | * | 12/1985 | Devaney | 700/90 |
| 4,594,662 A | * | 6/1986 | Devaney | 700/90 |
| 5,469,851 A | * | 11/1995 | Lipschutz | 600/447 |
| 5,477,849 A | * | 12/1995 | Fry | 128/200.14 |
| 5,477,859 A | * | 12/1995 | Engeler | 600/447 |
| 5,544,128 A | * | 8/1996 | Kim et al. | 367/119 |
| 5,647,365 A | * | 7/1997 | Abboud | 600/447 |
| 5,680,863 A | * | 10/1997 | Hossack et al. | 600/459 |
| 5,690,114 A | * | 11/1997 | Chiang et al. | 600/447 |
| 5,735,282 A | * | 4/1998 | Hossack | 600/458 |
| 5,784,336 A | * | 7/1998 | Gopinathan et al. | 367/123 |
| 5,827,188 A | * | 10/1998 | Wright et al. | 600/447 |
| 5,856,955 A | * | 1/1999 | Cole et al. | 367/138 |
| 5,957,846 A | * | 9/1999 | Chiang et al. | 600/447 |
| 5,964,709 A | * | 10/1999 | Chiang et al. | 600/447 |
| 5,995,450 A | * | 11/1999 | Cole et al. | 367/138 |
| 6,042,547 A | * | 3/2000 | Wright et al. | 600/447 |
| 6,104,673 A | * | 8/2000 | Cole et al. | 367/138 |
| 6,106,472 A | * | 8/2000 | Chiang et al. | 600/447 |
| 6,110,116 A | * | 8/2000 | Wright et al. | 600/447 |
| 6,135,961 A | * | 10/2000 | Pflugrath et al. | 600/447 |

(Continued)

*Primary Examiner* — Nicholas Evoy
(74) *Attorney, Agent, or Firm* — Alan A. R. Cooper; Frederick J. Telecky, Jr.

(57) ABSTRACT

A method of ultrasound receive beamforming includes receiving a first plurality of sensing signals from target tissue, forming a first plurality of digital sensing signals, and data processing the digital sensing signals along a first plurality of data paths to form a first plurality of delayed and apodized digital sensing signals. Data path combining generates data combinations of the delayed and apodized digital sensing signals to include two or more of the delayed and apodized digital sensing signals that originate from different ones of the transducer elements. The data combinations are interpolation filtered using a plurality of interpolation filters to form a second plurality of delayed and apodized digital sensing signals, which are then summed to form an ultrasound receive beamformed signal. The interpolation filters can be interpolation filters in a single shared filter bank, with each interpolation filter providing a different fractional delay.

3 Claims, 6 Drawing Sheets

(56) References Cited

U.S. PATENT DOCUMENTS

| | | | |
|---|---|---|---|
| 6,172,939 B1* | 1/2001 | Cole et al. | 367/138 |
| 6,363,033 B1* | 3/2002 | Cole et al. | 367/138 |
| 6,552,964 B2* | 4/2003 | Chiang et al. | 367/138 |
| 6,648,826 B2* | 11/2003 | Little et al. | 600/457 |
| 6,721,235 B2* | 4/2004 | Chiang et al. | 367/138 |
| 7,393,324 B2* | 7/2008 | Satoh | 600/437 |
| 7,508,737 B1* | 3/2009 | Alexandru | 367/103 |
| 7,604,596 B2* | 10/2009 | Hwang et al. | 600/443 |
| 7,993,270 B2* | 8/2011 | Bae | 600/437 |
| 8,416,643 B2* | 4/2013 | Magee | 367/138 |
| 2002/0064093 A1* | 5/2002 | Chiang et al. | 367/138 |
| 2002/0080683 A1* | 6/2002 | Chiang et al. | 367/138 |
| 2002/0082500 A1* | 6/2002 | Henderson et al. | 600/443 |
| 2003/0076904 A1* | 4/2003 | Magee | 375/340 |
| 2003/0163047 A1* | 8/2003 | Little et al. | 600/457 |
| 2004/0019277 A1* | 1/2004 | Bae | 600/437 |
| 2004/0133110 A1* | 7/2004 | Little et al. | 600/457 |
| 2005/0265267 A1 | 12/2005 | Hwang | |
| 2006/0036169 A1* | 2/2006 | Satoh | 600/437 |
| 2006/0287596 A1* | 12/2006 | Johnson et al. | 600/437 |
| 2006/0293597 A1* | 12/2006 | Johnson et al. | 600/437 |
| 2007/0055151 A1* | 3/2007 | Shertukde et al. | 600/437 |
| 2007/0236374 A1* | 10/2007 | Brueske et al. | 341/143 |
| 2008/0262351 A1 | 10/2008 | Scampini | |
| 2009/0326375 A1* | 12/2009 | Magee | 600/443 |
| 2010/0012119 A1 | 1/2010 | Sallak et al. | |
| 2010/0249596 A1* | 9/2010 | Magee | 600/447 |
| 2013/0294665 A1* | 11/2013 | Rao et al. | 382/131 |

\* cited by examiner

| PARAMETER | LOW END | MID END | HIGH END |
|---|---|---|---|
| SAMPLING RATE (MHz) | 24 | 40 | 50 |
| DELAY ACCURACY (nsec) | 10 | 10 | 5 |
| NUMBER OF CHANNELS | 64 | 128 | 1024 |
| NUMBER OF FILTER COEFFS | 4 | 8 | 16 |
| MLAs | 1 | 4 | 8 |
| BASELINE IMPLEMENTATION (MMULTS) | 1.99 | 47.88 | 1808.62 |
| NEW IMPLEMENTATION (MMULTS) | 1.72 | 11.64 | 219.43 |
| REDUCTION | 13.6% | 75.7% | 87.9% |

FIG. 7

RECEIVE BEAMFORMER FOR ULTRASOUND

CROSS REFERENCE TO RELATED APPLICATIONS

This application claims the benefit of Provisional Application Ser. No. 61/076,173 entitled "A REDUCED COMPLEXITY BEAMFORMER FOR ULTRASOUND APPLICATIONS" filed Jun. 27, 2008, which is herein incorporated by reference in its entirety.

FIELD OF THE INVENTION

Embodiments of the invention relate to receive beamformers for ultrasound and related beamforming algorithms, and integrated circuits (ICs) and ultrasound systems therefrom.

BACKGROUND

Beamforming is a signal processing technique used in sensor arrays for directional signal transmission or reception. Spatial selectivity is achieved by using adaptive or fixed receive/transmit beam patterns.

Beamforming can be used for both electromagnetic waves (e.g., RF) and sound waves, and has found a variety of applications in radar, seismology, sonar, wireless communications, radio astronomy, speech, and medicine. Adaptive beamforming is used to detect and estimate the signal-of-interest at the output of a sensor array using data-adaptive spatial filtering and interference rejection.

One medical application that uses beamforming is for ultrasound diagnostics. Ultrasound energy is focused at target tissue by a transmit beamformer, and ultrasound energy modulated and returned by the target tissue is focused by a receive beamformer. The receive beamformer may provide signals for generation of B-mode images, color Doppler or spectral Doppler information representing the target tissue, or combinations thereof. Such beamforming systems can provide real-time, cross-sectional (tomographic) 2D images of human body tissue or the tissue of another subject.

Figure 1:
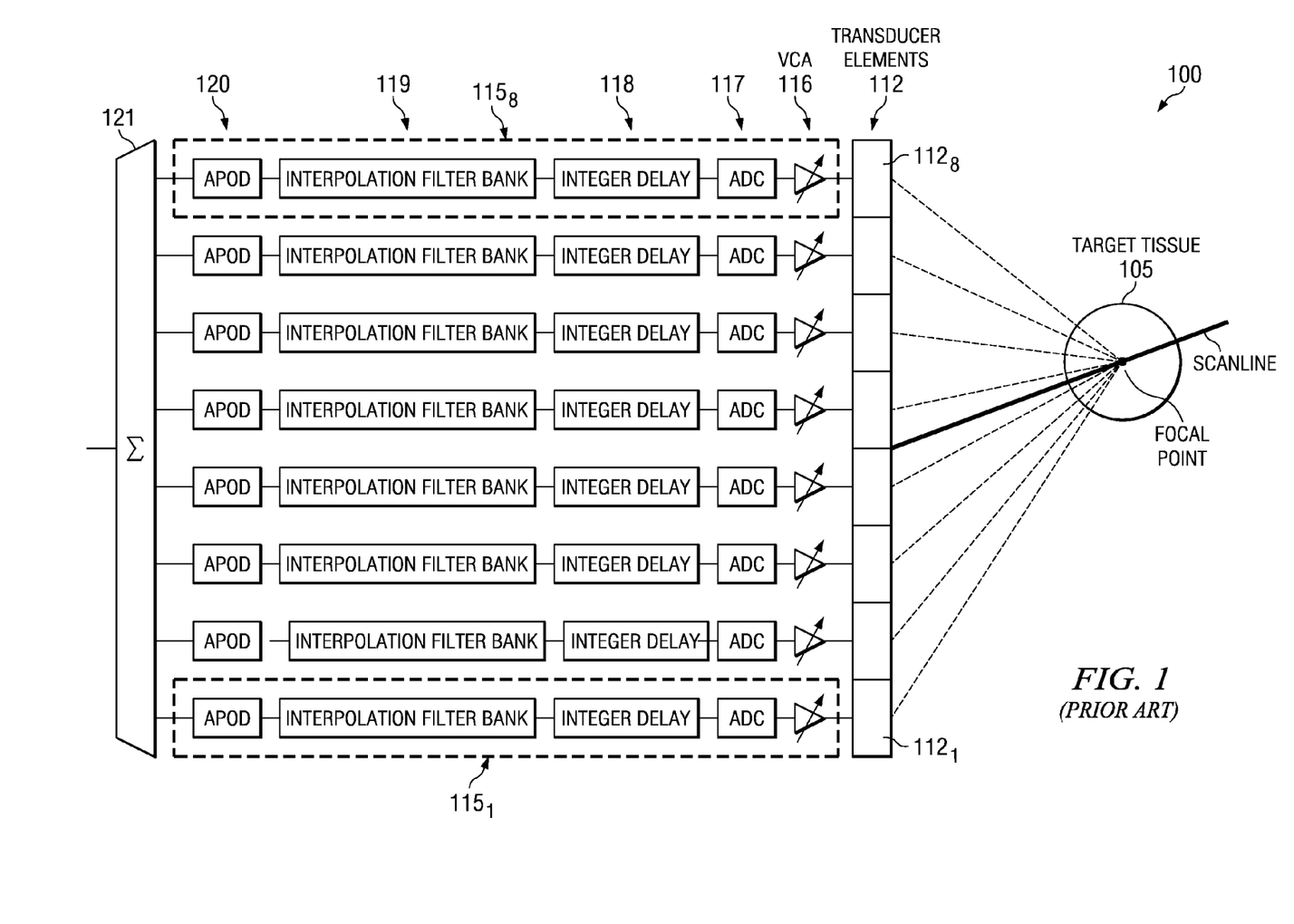
FIG. 1 is a simplified block diagram depiction of a conventional delay and sum ultrasound receive beamformer system for imaging target tissue.

FIG. 1 shows a simplified block diagram depiction of a conventional delay and sum ultrasound receive beamformer system 100 for imaging target tissue 105. Beamformer system 100 comprises a plurality (M) of transducer elements 112 shown as eight transducer elements $112_1$-$112_8$ which each comprise separate piezoelectric transducers that convert sound waves echoed by the target tissue 105 into electrical signals. Although only eight (M=8) transducer elements $112_1$-$112_8$ are shown in FIG. 1, a practical ultrasound receive beamformer system 100 may have many more transducer elements, such as several hundred or more. Separate data processing paths $115_1$-$115_8$ are seen to be dedicated to each of the transducer elements $112_1$-$112_8$. The data processing paths $115_1$-$115_8$ each comprise in serial connection a voltage controlled amplifier (VCA) 116, an analog to digital converter (ADC) 117 for digital conversion of the amplified transducer signal, and an integer delay 118 for adding the integer portion of the desired delay value. A plurality of interpolation filter banks 119 each comprising a plurality of interpolation filters is also provided. The plurality of interpolation filters in each interpolation filter bank 119 provide a plurality of different fractional portions of the desired delay value for each of the data processing paths $115_1$-$115_8$, since as known in the art the desired delay values are not integer multiples of the ADC sampling period (Ts) because in general the desired timing resolution (Tres) is <Ts.

For conventional ultrasound applications, Tres is generally between 1 to 10 nsec and the Ts of the ADCs 117 is generally from 20 to 200 nsec (corresponding to 50 MHz to 5 MHz operation). Tres thus determines the number of interpolation filters (P) in each interpolation filter bank 119 needed to provide the plurality of different fractional delay portions for each of the dedicated data processing paths $115_1$-$115_8$ for beamformer system 100. For example, without decimation filtering, P=ceil(Ts/Tres) to achieve the desired Tres, such as P=20 interpolation filters in each interpolation filter bank 119 in the case Ts=20 nsec and Tres=1 nsec. The ceil function returns an integer by rounding its argument towards infinity (upward). Beamformer system 100 thus includes M interpolation filter banks 119, each containing P interpolation filters.

Several methods are known for interpolation filtering, such as Lagrangian, and sinc approximation. The implementation generally assumes a given number of finite impulse response (FIR) filter coefficients. It is usually assumed that the FIR filter coefficients can change on a sample-by-sample-basis. A polyphase interpolation FIR filter is a common implementation that reduces the number of computations required per cycle as compared to a direct implementation of an interpolation filter.

Each of the dedicated data paths $115_1$-$115_8$ also include an apodization gain block 120 so that each received signal is scaled by a desired value by an apodization factor to reduce the grating side lobe effects in the later formed beamformed signal due to lateral pressure field amplitude variations and the spacing of the transducer elements $112_1$-$112_8$. Apodization factors can generally be changed on a sample-by-sample basis. An adder 121 sums the respective signals from each of the data paths $115_1$-$115_8$ provided by the respective apodization gain blocks 120 to generate the desired beamformed signal which can then be used to form an image of the target tissue 105 on a suitable display device.

The conventional delay and sum ultrasound receive beamformer system 100 described above produces effective focal points along a given scanline (e.g., such as the scanline shown in FIG. 1) to focus the receive echoes from portions of target tissue 105 that lie along a given scanline. When the receive beamformer system 100 beamforms more than one scanline, the beamforming is commonly referred to as Multiple Line Acquisition (MLA).

In a conventional beamforming implementation, such as when using conventional delay and sum ultrasound receive beamformer system 100, the response from each of the respective interpolation filter banks 119 from the received signal originating from its single associated transducer element 112 can be written as a summation over the filter coefficients k of the interpolation filters in the interpolation filter banks 119 as:

$$y_i[n] = \sum_{k=-\infty}^{\infty} h_{i(n)}[k] x_i[n - k - d_i[n]] \text{ for } 0 \leq n \leq N - 1 \quad \text{Equation \#1}$$

Where:
$x_i[n]$ is the signal from the $i^{th}$ receive data path channel $115_1$-$115_8$ at time sample n.
$h_{i(n)}[k]$ is the $k^{th}$ coefficient of the respective interpolation filter for the $i^{th}$ receive channel at time sample n.
$y_i[n]$ is the filtered signal for the $i^{th}$ receive data path channel $115_1$-$115_8$ at time sample n.
$d_i[n]$ is the integer delay for $i^{th}$ receive data path channel $115_1$-$115_8$ at time sample n.

It is noted that this filtering operation is piece-wise linear, i.e. at each sample instance n, the output of interpolation filter bank 119 is a linear combination of input samples. The beamformed signal response for a single scanline is found by summing (e.g., using summer 121) the responses from each of the data paths $115_1$-$115_8$ after processing by apodization gain blocks 120 to represent signals from all M receive transducer elements $112_1$-$112_8$, which can be expressed as:

$$z[n] = \sum_{m=0}^{M-1} a_m[n] \sum_{k=-\infty}^{\infty} h_{m(n)}[k]x_m[n-k-d_m[n]] \quad \text{Equation \#2}$$

Where $a_m[n]$ is the apodization factor for the $m^{th}$ receive signal at time sample n, and z[n] is the beamformed received signal at time sample n.

A measure of computational complexity for receive beamformers can be found by calculating the number of multiplies (referred to herein as numMults) needed for implementing the beamforming operation. To calculate z[n] as shown above, numMults is given by Equation 3 shown below:

$$\text{numMults} = L \cdot M \cdot (K+1) \cdot N \quad \text{Equation \# 3}$$

Where K is the number of filter coefficients per interpolation filter, L is the number of MLAs, M is the number of receive transducer elements and N is the number of output samples. The numMults required in a beamformer algorithm determines the gate count in an IC implementation, and as a result the power dissipation and thus the cooling requirements for a given implementation. Due to the high numMults required for implementing the algorithm used by conventional beamformer data architecture, such as implemented by the delay and sum ultrasound receive beamformer system 100 shown in FIG. 1, such conventional beamformers have generally been limited to ASIC implementations and have had to significantly limit the number of data channels and thus the spatial resolution provided.

SUMMARY

This Summary is provided to comply with 37° C.F.R. §1.73, presenting a summary of the invention to briefly indicate the nature and substance of the invention. It is submitted with the understanding that it will not be used to interpret or limit the scope or meaning of the claims.

Embodiments of the invention describe new data path architectures for ultrasound receive beamforming applications involving a plurality transducer elements that are less computationally intensive as compared to conventional data architectures for ultrasound receive beamforming. Embodiments of the invention enable a significant reduction in the number of multiplies as compared to the conventional data path architecture described above, and generally provide mathematically equivalent signals so that the same quality images can generally be generated therefrom. The reduction in number of multiplies can be used to save gate count and lower power in a given implementation, or enable the use of more data channels to improve system performance.

The Inventor has recognized that the dedicated interpolation filter bank requirement for each data channel associated with each of the M transducer elements, such as a dedicated interpolation filter bank 119 (having P interpolation filters) for each of the transducer elements $112_1$-$112_8$ shown in FIG. 1 for conventional delay and sum ultrasound receive beamformer system 100, can be eliminated. By implementing a suitable switching network as described below that allows combining data originating from a plurality of different transducer elements to any of a plurality of interpolation filters in a shared interpolation filter bank, the dedicated interpolation filter bank requirement for conventional beamformer systems can be removed.

Embodiments of the invention thus generally implement data path combining before interpolation filtering, rather than the data path combining after interpolation filtering in conventional architectures. As a result, the minimum number of interpolation filter banks is one, which allows a significantly lower gate count, and as a result lower power and thus a lower cooling requirement for a given circuit implementation.

Embodiments of the invention are generally described as being directed to receive beamforming for ultrasound applications. However, embodiments of the invention can also be used for electromagnetic (e.g., RF) applications, and other sound wave processing applications.

DETAILED DESCRIPTION

Embodiments of the invention are described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. Embodiments of the invention are not limited by the illustrated ordering of acts or events, as some acts may occur in different orders and/or concurrently with other acts or events. Furthermore, not all illustrated acts or events are required to implement a methodology in accordance with embodiments of the invention.

As described above, embodiments of the invention are based on the Inventor recognizing that that the conventional dedicated interpolation filter bank requirement for each data channel associated with each of the M transducer elements can be eliminated. As described below, by implementing a suitable switching network that allows combining data originating from a plurality of different transducer elements for processing by any of the plurality of interpolation filters in a shared interpolation filter bank, the dedicated interpolation filter bank requirement for conventional beamformer systems can be removed. As a result, the minimum number of interpolation filters needed for a given receive beamfinder implementation according to embodiments of the invention can be set by the desired timing resolution P=ceil(Ts/Tres), which is much less than the number of transducer elements (M) in a practical ultrasound beamformer system.

Mathematically, embodiments of the invention invert (or swap) the summations over m and k in Equation #2 shown above. Equation #2 sums first over k (interpolation filter coefficients) then over m (transducer elements). In contrast, Equation #4 according to an embodiment of the invention shown below first sums over m (transducer elements), then over k (interpolation filter coefficients):

$$z[n] = \sum_{k=-\infty}^{\infty} \sum_{m=0}^{M-1} a_m[n] h_{m(n)}[k] x_m[n-k-d_m[n]] \quad \text{Equation \#4}$$

Equation #4 can be rewritten as Equation #5 below which provides a mapping for the $m^{th}$ receive signal to the $p^{th}$ interpolation filter in the shared interpolation filter bank:

$$z[n] = \sum_{k=-\infty}^{\infty} \sum_{m=0}^{M-1} a_m[n] h_{p(m,n)}[k] x_m[n-k-d_m[n]] \quad \text{Equation \#5}$$

Where:

$$p(m, n) \in \{0, 1, \ldots, P-1\}$$

$$P = \text{ceil}\left(\frac{T_s}{T_{res}}\right)$$

The control signal p(m,n) thus controls the selection of a particular one of the P interpolation filters provided by the system for processing data provided by any of the M data channels at each time sample n. In the specific instance there are P=10 interpolation filters (e.g., when Ts=10*Tres) in the system, the interpolation filters can be embodied as interpolation filters each providing a different fractional delay, such as filter $h_0$ (delay=0*$T_s$=0 (no delay)), $h_1$ (delay=1*$T_s$), $h_9$ (delay=9*$T_s$). z[n] in Equation #5 can be rewritten as Equation #6 shown below so that it provides mapping for the $p^{th}$ group of received signals back to the original $m^{th}$ received signal $$z[n] = \sum_{k=-\infty}^{\infty} \sum_{p=0}^{P-1} h_p[k] \sum_{s=0}^{S(p,n)-1} a_{I(p,s)}[n] x_{I(p,s)}[n-k-d_{I(p,s)}[n]] \quad \text{Equation \#6}$$

Where I(p,s) provides a mapping for the $s^{th}$ signal in the $p^{th}$ group of received signals to the original $m^{th}$ received signal and S(p,n) is the number of receive signals using the $p^{th}$ interpolation filter at time sample n.

Equation #6 can be written as Equation #7:

$$z[n] = \sum_{k=-\infty}^{\infty} \sum_{p=0}^{P-1} h_p[k] z_p[n, k, d] \quad \text{Equation \#7}$$

Where $$z_p[n, k, d] = \sum_{s=0}^{S(p,n)-1} a_{I(p,s)}[n] x_{I(p,s)}[n-k-d_{I(p,s)}[n]]$$

The total number of multiplies (numMults) in Equation #7 can be written as:

numMults=(M+L·P)·K·N

Where K is the number of filter coefficients per interpolation filter, L is the number of MLAs; M is the number of receive transducer elements, N is the number of output samples, and P is the number of interpolation filters.

As described above in the Background (Equation 3), the numMults for the conventional ultrasound receive beamforming algorithm is:

numMults=L·M·(K+1)·N

Accordingly, the ratio (Ratio) of numMults for the conventional ultrasound receive beamforming algorithm to ultrasound receive beamforming algorithms according to an embodiment of the invention can be approximated by the following equation:

Ratio≈1/L+P/M.

Thus, as the Ratio decreases, the relative performance in terms of reducing numMults for embodiments of the invention improves. The relative performance of embodiments of the invention can be seen to improve as the number of receive transducer elements (M) increases, which is known to improve spatial resolution, and decreases as the total number of interpolation filters increases. As described above, the minimum number of interpolation filters can be set by Ts and Tres by P=ceil(Ts/Tres). Since M>>P in practical ultrasound beamforming systems, embodiments of the invention generally significantly reduce numMults.

Figure 2:
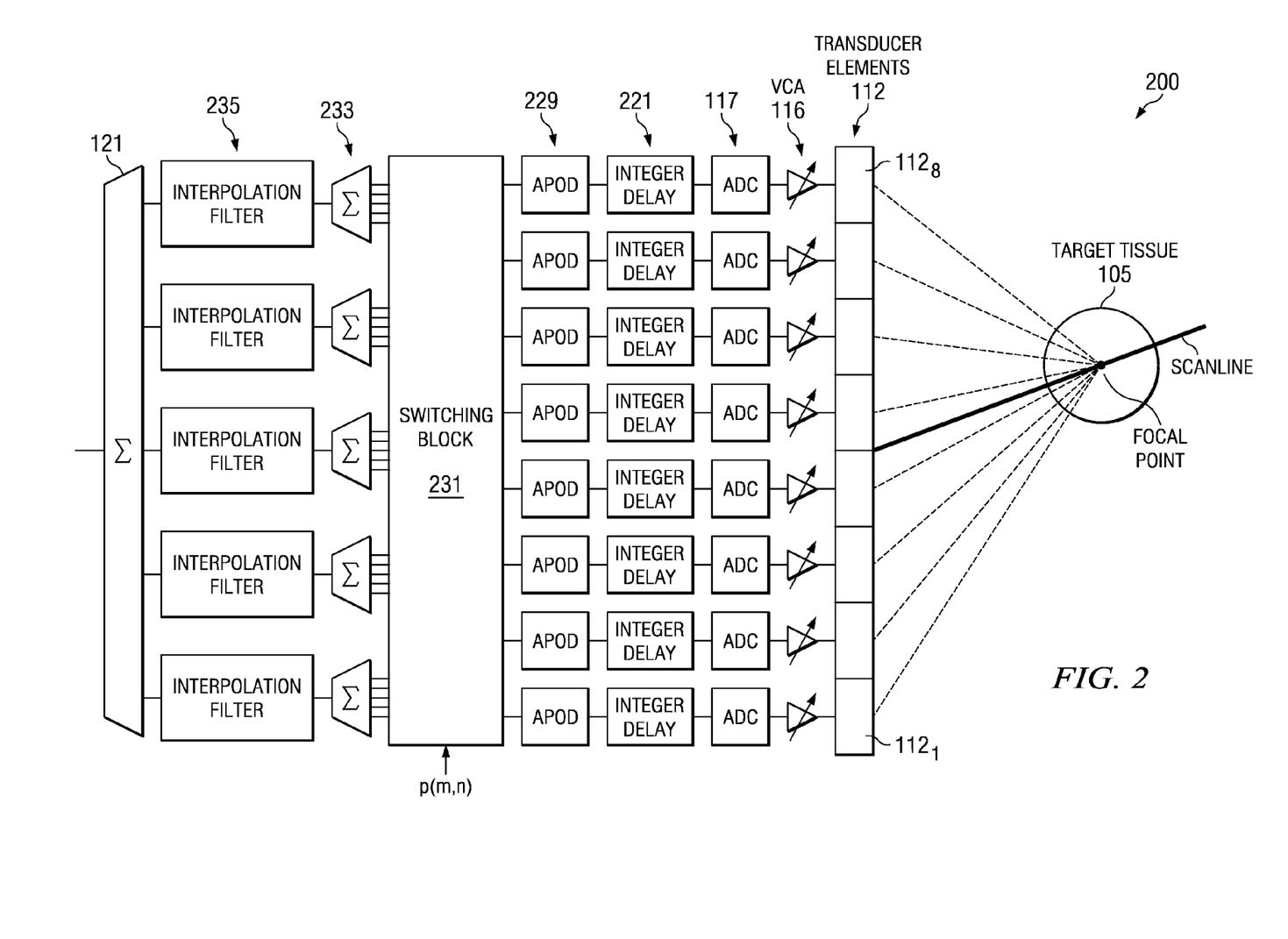
FIG. 2 is a simplified block diagram depiction of a delay and sum, data path combined ultrasound receive beamformer system for imaging target tissue, according to an embodiment of the invention.

FIG. 2 shows simplified block diagram depiction of a delay and sum, data path combined ultrasound receive beamformer system 200 for imaging a target tissue 105, according to an embodiment of the invention. Beamformer system 200 comprises a plurality (M) of transducer elements $112_1$-$112_8$ which comprise piezoelectric transducers that convert sound waves echoed by the target tissue 105 into electrical signals. As in conventional delay and sum ultrasound receive beamformer system 100 shown in FIG. 1, the transducers 112 are each coupled to a VCA 116 then to an ADC 117 for digital conversion of the amplified transducer signal. The ADCs 117 in FIG. 2 are each coupled to integer delays 221, which provide appropriate integer sample delays to compensate for different signal arrival times due to path length differences between the target tissue 105 and the respective transducer elements $112_1$-

$112_8$. The delays 221 are coupled to apodization gain blocks 229 for scaling the delayed values. Apodization gains provided by the apodization gain blocks 229 can generally be changed on a sample-by-sample basis.

The outputs of the respective apodization gain blocks 229 are coupled to a switching block 231. Switching block 231 controls which of the P interpolation filters in shared interpolation filter bank 235 (one interpolation filter providing a delay $h_0$, a second interpolation filter providing a delay $h_1$, . . .) to direct respective data received from the apodization filter blocks 229 to, based on the information provided by the control signal p(m,n) shown in FIG. 2. Significantly, the interpolation filters in shared interpolation filter bank 235 are thus not dedicated to process data originating from a particular one of the transducer elements $112_1$-$112_8$ as are each of the P interpolation filters in each of the interpolation filter banks 119 in conventional delay and sum ultrasound receive beamformer system 100 shown in FIG. 1. As described above this aspect of embodiments of the invention allows the minimum number of interpolation filters for a given ultrasound receive beamformer implementation according to embodiments of the invention to be determined using the desired timing resolution Tres, such that P=ceil(Ts/Tres).

A plurality of pre-summing blocks 233 are shown interposed between switching block 231 and the shared interpolation filter bank 235. Switching block 231 is operable to generally direct signals originating from any combination of the plurality of different transducers $112_1$-$112_8$ to any of the pre-summing block 233 for processing by a given one of the P interpolation filters in shared interpolation filter bank 235. Although four (4) signals are shown output by switching block 231 to each of the pre-summing blocks 233, embodiments of the invention can couple less than four (4) signals or as many signals as the number of transducer elements. An adder 121 sums the P signals from the P interpolation filters in the shared interpolation filter bank 235 to generate the desired beamformed signal which can then be used to form an image of the target tissue 105 on a suitable display device.

As described above, delay and sum, data path combined ultrasound receive beamformer system 200 includes the respective interpolation filters embodied as interpolation filters in a single shared interpolation bank 235. Thus, only P interpolation filters are needed. This can be compared to conventional delay and sum ultrasound receive beamformer system 100, which as described above requires comprises M interpolation filter banks 119, each containing P interpolation filters. Embodiments of the invention thus reduce the number of interpolation filters in the ultrasound receive beamformer system which allows a significantly lower gate count, lower power and thus lower cooling requirements for a given circuit implementation.

The simplified data architecture disclosed herein thus enables a reduced number of multiplies (i.e. numMults) in the design while generally remaining mathematically equivalent to the conventional delay and sum ultrasound receive beamformer system 100 implementation shown in FIG. 1. Accordingly, beamformed signals provided by delay and sum, data path combined ultrasound receive beamformer system 200 generally result in the same image quality as beamformed signals from conventional delay and sum ultrasound receive beamformer system 100. The reduction in the number of multiplies allows a reduction in gate count for an ASIC implementation, and enables a DSP implementation for systems such as ultrasound beamformer systems and reduced power requirements for such DSP implementations.

Figure 3A:
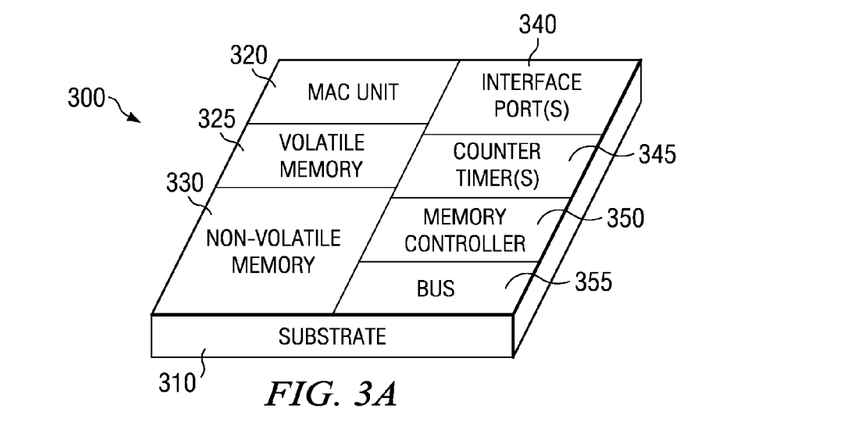
FIG. 3A is a simplified block diagram of a digital signal processor (DSP) IC that can implement the delays, apodization gains, switching blocks, pre-summing blocks, interpolation filters, an adder, and the control signal p(m,n) generator data architecture shown in FIG. 2, according to an embodiment of the invention.

FIG. 3A shows a simplified block diagram of a DSP IC 300 according to an embodiment of the invention that can implement the data architecture shown in FIG. 2 comprising delays 221, apodization gain blocks 229, switching block 231, pre-summing blocks 233, shared interpolation filter bank 235, adder 121, and the control signal generator for generating the control signal p(m,n) that is applied to switching block 231. Gate count efficiencies provided by data path architectures according to embodiments of the invention enable receive beamforming implementations for moderate channel count systems (e.g., 32 transducers/data channels) on a single DSP IC, rather than a plurality of DSP ICs required by conventional data architectures due to power budget considerations.

DSP IC 300 is shown formed on a substrate 310 having a semiconductor surface (e.g., a silicon substrate) and comprises a multiply-accumulate (MAC) unit 320 that is operable to generate control signals, such as p(m,n) shown in FIG. 2. DSP IC 300 generally includes a volatile memory (e.g., RAM) 325 and non-volatile memory (e.g., ROM) 330. Algorithms according to embodiments of the invention can be stored in non-volatile memory 330. The DSP IC 300 is also shown including interface port(s) 340 for inputs and outputs, counter/timers 345, memory controller 350 and bus 355.

As with conventional DSPs, the DSP IC 300 can execute instructions to implement one or more digital signal processing algorithms or processes. For instance, the instructions data can include various coefficients and instructions that, when loaded and initialized into DSP IC 300, can prompt the digital signal processor IC 300 to implement different digital signal processing algorithms or processes, such as a digital filter. The digital signal processor IC 300 can receive data from ADC's 117 shown in FIG. 2 and then apply an algorithm to the data according to its current configuration.

MAC unit 320 generally includes delaying and apodizing circuitry for processing digitized ultrasound sensing signals to form delayed and apodized digital ultrasound sensing signals. MAC unit 320 also generally includes data path combining circuitry for generating data combinations of the plurality of delayed and apodized digital sensing signals to include two or more delayed and apodized digital sensing signals that originate from different transducer elements. Moreover, MAC unit 320 generally provides the shared interpolation filter bank that is coupled to the output of the data path combining circuitry for interpolation filtering the data combinations to generate a second plurality of delayed and apodized digital sensing signals. As described above, the second plurality of delayed and apodized digital sensing signals output by the interpolation filter bank are combined by an adder to generate the ultrasound receive beamformed signal. MAC unit 320 can also generally provide the adder.

Figure 3B:
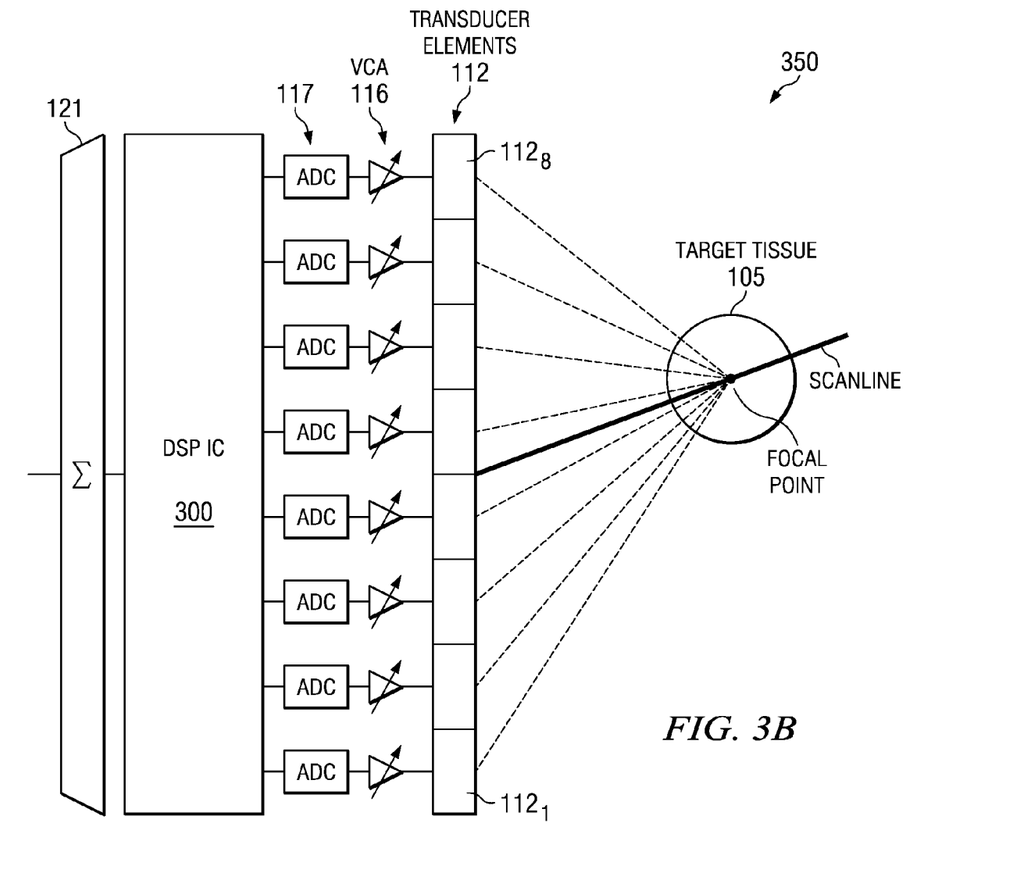
FIG. 3B is a simplified block diagram depiction of a delay and sum, data path combined ultrasound receive beamformer system for imaging a target tissue which utilizes a single DSP IC, such as the DSP IC shown in FIG. 3A, according to an embodiment of the invention.

FIG. 3B is a simplified block diagram depiction of a delay and sum, data path combined ultrasound receive beamformer system 350 for imaging a target tissue which utilizes a single DSP IC, such as the DSP IC shown in FIG. 3A, according to an embodiment of the invention. DSP IC 300 in delay and sum, data path combined ultrasound receive beamformer system 350 can generally support at least 32 transducer elements 112 (data channels).

For high channel count systems (e.g., 128 transducers/data channels) even with the gate count efficiencies provided by data path architectures according to embodiments of the invention, receive beamforming implementation on a single DSP chip may not be feasible absent some complex or elaborate cooling arrangement, due to power budget considerations. However, in an embodiment of the invention regions of interpolation filter banks (i.e. groups of interpolation filters) are used together for high channel count systems.

Figure 4:
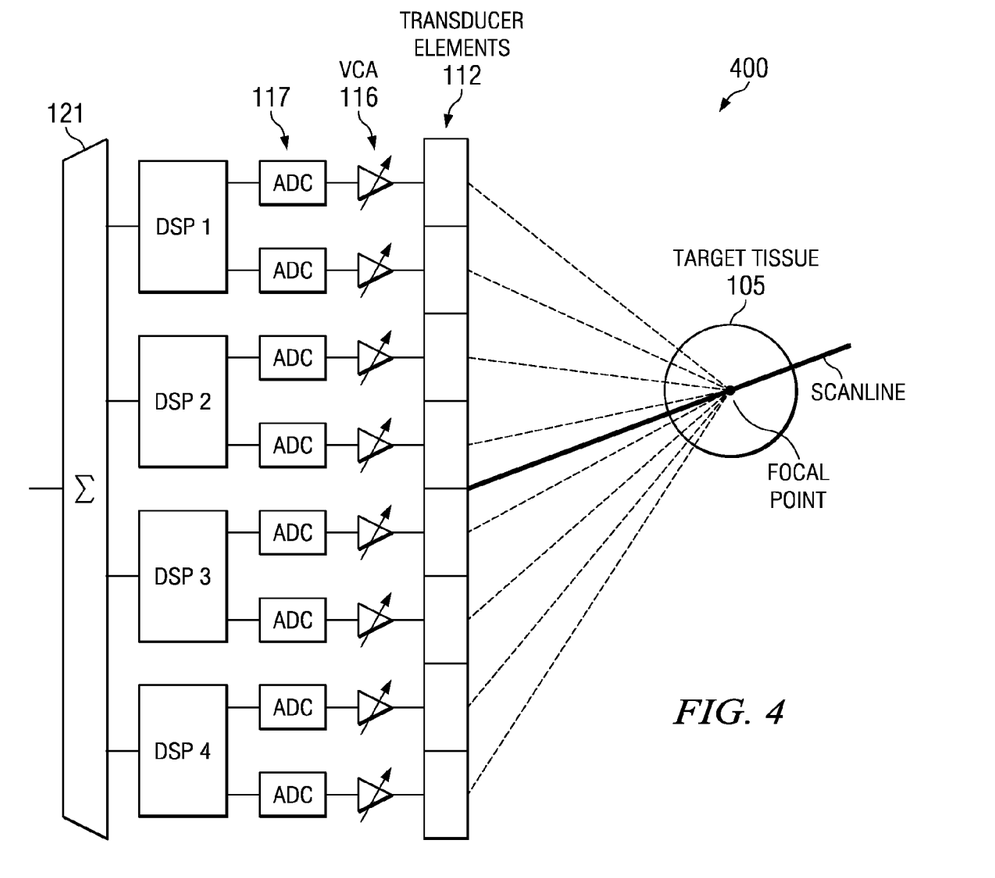
FIG. 4 is a simplified block diagram depiction of a delay and sum, data path combined ultrasound receive beamformer system for imaging a target tissue which utilizes a plurality of DSP ICs, such as a plurality of the DSP IC shown in FIG. 3A, according to an embodiment of the invention.

FIG. 4 is a simplified block diagram depiction of a delay and sum, data path combined ultrasound receive beamformer system 400 for imaging a target tissue 105 which utilizes a plurality of DSP ICs, connected in parallel shown as DSP 1, DSP 2, DSP 3, and DSP 4, such as using DSP IC 300 shown in FIG. 3A, according to an embodiment of the invention. In this embodiment, the respective DSPs can each provide signal processing for a subset of the data channels (i.e. each DSP processing signals originating from a plurality of transducers representing a subset of the total number of transducer elements in system 400 so that each DSP provides processing for a portion of the scanlines). Although for simplicity a total of eight data channels are shown in FIG. 4 with two data channels per DSP, as described above DSPs implementing data architectures described herein can generally support at least 32 data channels. Adder 121 sums the signals output by DSP 1, DSP 2, DSP 3, and DSP 4 to combine all the scanlines to generate the desired beamformed signal which can then be used to form an image of the target tissue 105 on a suitable display device.

Figure 5:
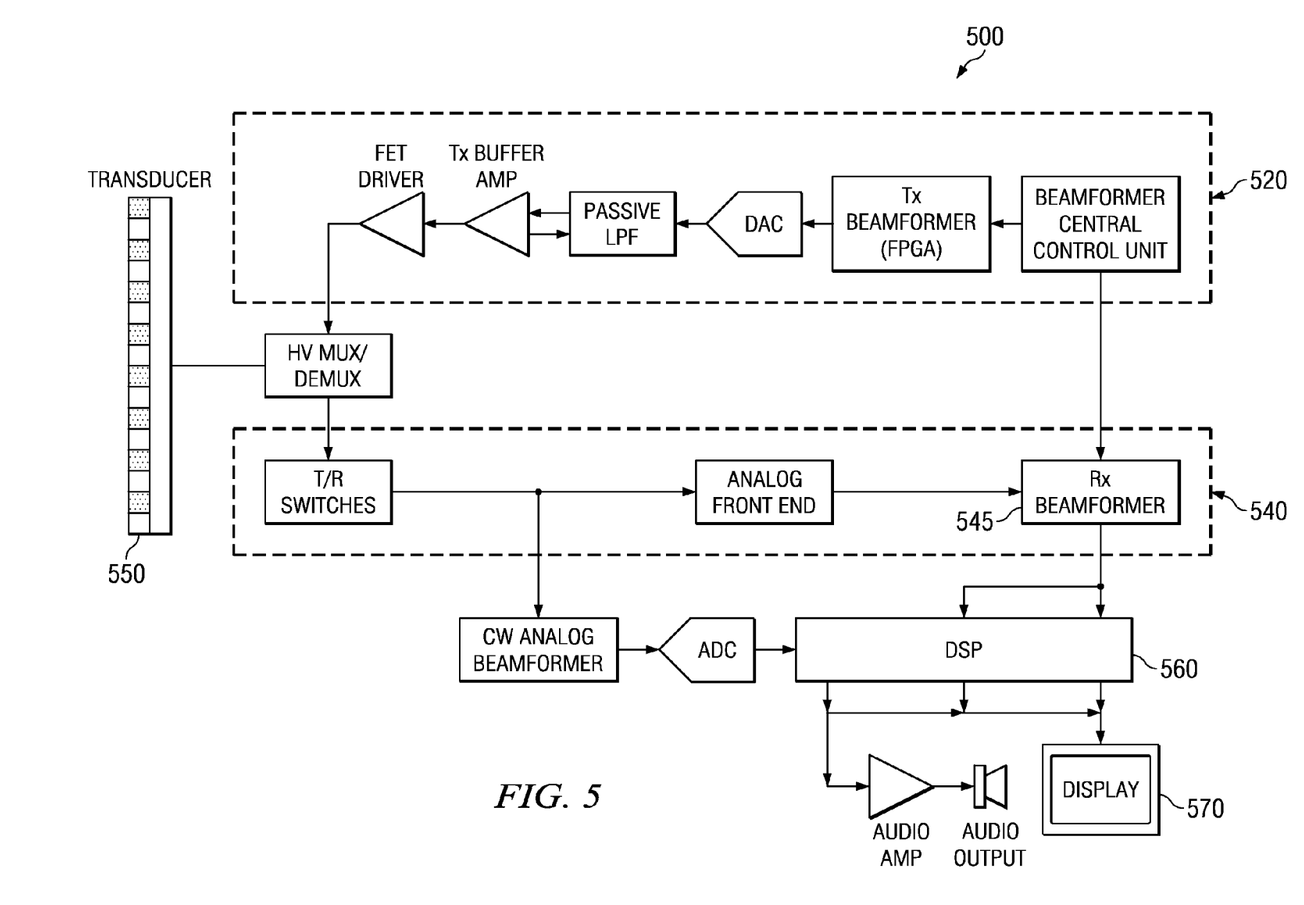
FIG. 5 is a block diagram of an exemplary ultrasound system, according to an embodiment of the invention.

FIG. 5 is a block diagram of an exemplary ultrasound system 500. System 500 includes a transmit section 520 and a receive section 540 that share a common array of transducers 550. Receive section 540 includes a receive (Rx) beamformer 545 that is coupled to a backend imaging DSP 560. Backend imaging DSP 560 is coupled to a display 570. Embodiments of the invention, such as the delay and sum, data path combined ultrasound receive beamformer system 200 shown in FIG. 2 with one or more of the DSP IC 300 (depending on channel count) shown in FIG. 3A can be used as the Rx beamformer 545 in system 500.

Figure 6:
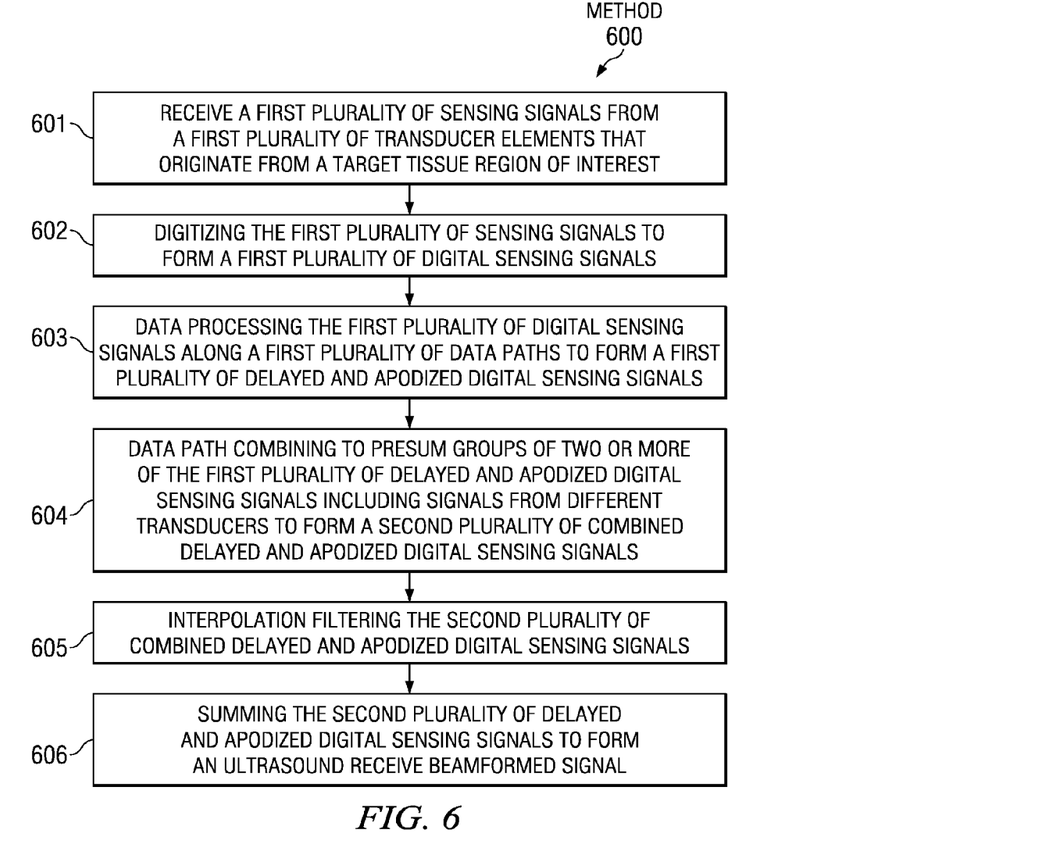
FIG. 6 is a flow chart for a method of ultrasound receive beamforming, according to an embodiment of the invention.

FIG. 6 is a flow chart for an exemplary method 600 of ultrasound receive beamforming, according to an embodiment of the invention. A first plurality of sensing signals are received in step 601 from a first plurality of transducer elements that originate from a target tissue region of interest. The first plurality of sensing signals are digitized in step 602 to form a first plurality of digital sensing signals. Step 603 comprises data processing the first plurality of digital sensing signals along a first plurality of data paths to form a first plurality of delayed and apodized digital sensing signals. Step 604 comprises data path combining to generate data combinations of the delayed and apodized digital sensing signals to include two or more of the delayed and apodized digital sensing signals that originate from different ones of the transducer elements. Step 605 comprises interpolation filtering the data combinations using a plurality of interpolation filters to form a second plurality of delayed and apodized digital sensing signals. The plurality of interpolation filters are generally in a single shared interpolation filter bank, wherein the plurality of interpolation filters each provide a different fractional delay. Step 606 comprises summing the second plurality of delayed and apodized digital sensing signals to form an ultrasound receive beamformed signal.

Although generally described for beamforming of sound waves, specifically for ultrasound beamforming applications, embodiments of the invention can also be used for electromagnetic (e.g. RF) applications, such as for radar, wireless communications and radio astronomy. Moreover, embodiments of the invention can be applied to other sound wave processing application, such as for seismology, sonar, and speech.

EXAMPLES

Embodiments of the invention are further illustrated by the following specific examples, which should not be construed as limiting the scope or content of embodiments of the invention in any way.

Figure 7:
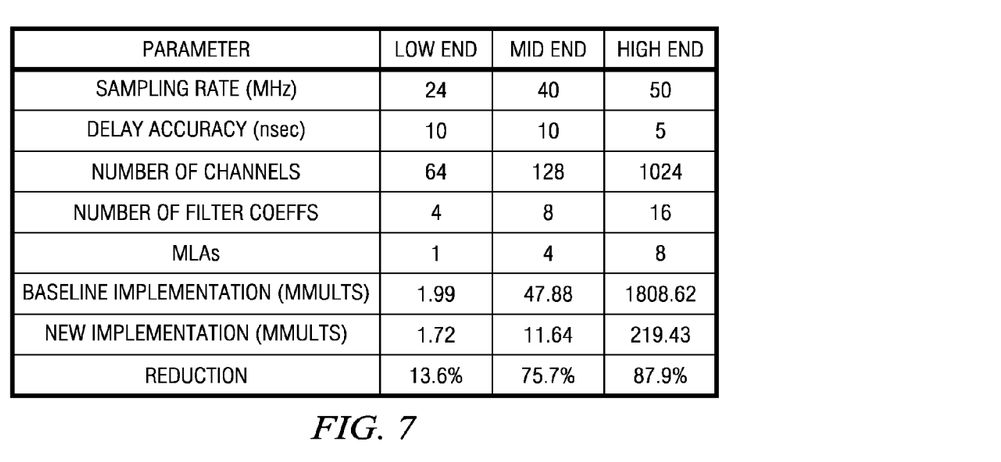
FIG. 7 shows a comparison of the number of multiplies required for a conventional ultrasound receive data architecture implementation and an ultrasound receive data architecture implementation according to an embodiment of the invention for selected parameters.

FIG. 7 shows a comparison of the number of multipliers numMults required for a conventional (shown as the "baseline implementation") ultrasound receive data architecture implementation and an ultrasound receive data architecture implementation according to an embodiment of the invention (shown as the "new implementation") for a selected variety of parameters, including sampling rate (MHz), delay accuracy, number of transducer elements/channels, filter order and MLAs. As the number of MLAs increases, the relative performance/efficiency of algorithms according to an embodiment of the invention improves. For a given number of transducer elements (M), the performance of algorithms according to an embodiment of the invention decreases as the number of interpolation filters (P) increases, although it is still better than the conventional ultrasound receive algorithm. The reduction in MMULTs ($10^6$ mults) is seen to range from 13.6% (for 64 transducer elements/channels) to 87.9% (for 1,024 transducer elements/channels).

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of embodiments of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

The invention claimed is:

1. A digital signal processor (DSP) integrated circuit (IC) for ultrasound signal processing, comprising:

a substrate having a semiconductor surface;

integer delaying and apodizing circuitry configured to process a first plurality of digitized ultrasound sensing signals to form a first plurality of delayed and apodized digital ultrasound sensing signals, data path combining circuitry configured to generate a plurality of data combinations of said first plurality of delayed and apodized digital sensing signals to include two or more of said first plurality of delayed and apodized digital sensing signals, each delayed and apodized digital ultrasound sensing signal having its own data path, that originate from a plurality of different transducers of a first plurality of transducer elements, a shared interpolation filter bank having a plurality of interpolation filters, each coupled to an output of said data path combining circuitry, for interpolation filtering said plurality of data combinations to generate a second plurality of delayed and apodized digital sensing signals, said shared interpolation filter bank comprising a plurality of interpolation filters, wherein the number of interpolation filters is set by a desired timing resolution and the number of interpolation filters is less than a number of said first plurality of transducer elements, wherein said plurality of interpolation filters each provides a different delay; and wherein said data path combining circuitry comprises a switching circuit that is operable to direct any of said first plurality of delayed and apodized digital sensing signals to any of said plurality of interpolation filters upon receiving a control signal, and an adder having a plurality of inputs, each coupled to an output of each of the plurality of the interpolation filters.

2. The digital signal processor (DSP) integrated circuit (IC) of claim 1, wherein said different delays are defined by an integer value multiplied by Tres, wherein Tres is the timing resolution (Tres) for said ultrasound receive beamformed signal and said integer value corresponds to integer values from zero to ceil(Ts/Tres)−1, where Ts is a sampling period for said digitizing of said digitizing signal.

3. The digital signal processor (DSP) integrated circuit (IC) of claim 1, wherein a plurality of pre-summing blocks are interposed between the switching block and the shared interpolation filter bank.

* * * * *